Patented May 22, 1951

2,553,785

UNITED STATES PATENT OFFICE 2,553,785

BICYCLOALKYLTHIOPHENES

Herman Pines and Bruno Kvetinskas, Riverside, Ill., assignors to Universal Oil Products Company, Chicago, Ill., a corporation of Delaware No Drawing. Application March 29, 1947,
Serial No. 738,209

18 Claims. (Cl. 260—329)

This invention relates to new compositions of matter consisting of the condensation products of thiophenes with bicycloalkenes. It is also concerned with a process for catalytically condensing a thiophene containing at least one substitutable nuclear hydrogen atom with a bicycloalkene.

It is an object of this invention to provide thiophenes in which at least one of the nuclear hydrogen atoms has been replaced by a bicycloalkyl group. Such compounds are useful as chemical intermediates in organic synthesis and in the production of germicides, medicinals, insecticides, and the like.

In one embodiment our invention relates to the product formed by reacting a thiophene containing at least one substitutable nuclear hydrogen atom with a bicycloalkene.

In a more specific embodiment our invention relates to a process which comprises reacting a thiophene containing a substitutable nuclear hydrogen atom with a bicycloalkene at condensation conditions in the presence of a thiophene condensation catalyst.

A thiophene which is convertible into a bicycloalkylthiophene by our process contains at least one hydrogen atom bound to the heterocyclic ring of four carbon atoms and one sulfur atom. The different bicycloalkylatable thiophenes may be represented by the formula:

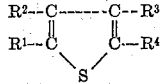

in which at least one of the groups $R^1$, $R^2$, $R^3$ and $R^4$ is a hydrogen atom and the other R groups are selected from the group consisting of hydrogen, alkyl, cycloalkyl, aryl, aralkyl, alkaryl, and naphthyl radicals. The foregoing compounds which contain at least one substitutable hydrogen atom in the ring may also contain substituents such as a halogen, hydroxyl, mercaptyl, alkoxy, or alkylthio radical attached to the ring.

Condensation agents with which the thiophenes containing at least one substitutable nuclear hydrogen atom are reacted in accordance with our invention consist of bicycloalkenes such as bicyclo-(2,2,1)-2-heptene (norbornylene); 2-methylbicyclo-(2,2,1)-2-heptene (1-methyl norcamphene-4); 2,6,6-trimethylbicyclo-(3,1,1)-2-heptene (α-pinene); and 5-methylbicyclo-(2,2,2)-2-octene. Bicycloalkenes that contain a relatively unreactive nonhydrocarbon substituent such as 2-chlorobicyclo-(2,2,1)-2-heptene, and 2-bromo-6-methylbicyclo-(2,2,1)-2-heptene also may be used. Bicycloalkenes in which both of the rings contain five or more carbon atoms condense with substitutable thiophenes with substantially no rearrangement of the carbon skeleton, whereas bicycloalkenes containing 3 or 4 carbon atoms in one ring occasionally tend to rearrange during condensation with substitutable thiophenes.

The catalysts that may be used in this process consist of those acid-acting substances that catalyze the condensation of thiophenes containing at least one substitutable nuclear hydrogen atom with bicycloalkenes. Such catalysts include unmodified metal halides of the Friedel-Crafts type such as aluminum chloride, ferric chloride, stannic chloride, zinc chloride, bismuth chloride, and the like; Friedel-Crafts metal halides dissolved in a suitable solvent such as stannic chloride dissolved in nitromethane or nitroethane; Friedel-Crafts metal halide-hydrocarbon complexes such as are prepared by reacting aluminum chloride with ethylene; solid catalysts comprising an active metal halide deposited on a support such as activated charcoal, alumina, fire brick, etc.; and addition complexes of alcohols, ethers, and ketones with a Friedel-Crafts metal halide such as aluminum chloride monomethanolate. Other catalysts include the acids of pentavalent phosphorus, particularly the ortho and pyro types, alone or deposited upon adsorbents or carriers of a siliceous character; alkaline earth acid phosphates such as the dihydrophosphates of calcium, strontium, and barium; cupric orthophosphate or a material formed by calcining hydrated cupric orthophosphate at a temperature within the range of from about 200 to about 400° C.; a salt or an acid salt of an acid of phosphorus and a material selected from the members of the right hand column of group II of the periodic table; liquid mixtures of sulfuric and phosphoric acids containing less than about 75% sulfuric acid, and sulfuric acid dissolved in acetic acid. Still other catalysts include boron fluoride, boron fluoride-ethyl ether complex, and mixtures of boron fluoride and water, said mixtures preferably containing a molecular excess of water. Another type of catalyst comprises sulfonic acids which have the formula $R(SO_3H)_n$ where R is selected from the group consisting of alkyl, cycloalkyl, aryl, aralkyl, alkaryl, and naphthyl radicals, and $n$ is a small integer usually 1 when R is an alkyl group and usually 1 or 2 when R is one of the other groups. When the R group contains a ring, one or more of the nuclear hydrogen atoms may be replaced by a halogen, hydroxyl, alkoxy, or similar substituent. The most common and cheapest type of sulfonic acids are the alkylsulfonic acids, made, for example, by oxidizing mercaptans, and the aryl sulfonic acids, frequently made by sulfonating a benzene hydrocarbon. Another group of catalysts include those known as metal oxide condensation catalysts. These substances include synthetic composites such as silica-alumina, silica-zirconia, silica-alumina-zirconia, silica-magnesia, silica-alumina-magnesia, alumina-boria, etc. They may be prepared in any suitable manner including separate, successive, or coprecipitation methods. In some cases naturally occurring metal oxides such as montmorillonite, acid-treated montmorillonite, and the like may be employed. These catalysts exhibit different degrees of potency, but all of them will catalyze, to some extent, the interaction of a thiophene containing at least one substitutable nuclear hydrogen atom with a bicycloalkene under suitable conditions of time, temperature, and pressure.

The process of our invention may be carried out in batch operation by placing a quantity of catalyst in a reactor equipped with a stirring device, adding the thiophene, heating or cooling to a reaction temperature, slowly adding the bicycloalkene while mixing the contents of the reactor, and recovering the condensation product. However, the preferred method of operation is of the continuous type. If the condensation catalyst is liquid, it is continuously charged to a reactor together with the thiophene and the bicycloalkene. The reactor effluent is passed to a settler wherein a separation is effected between the catalyst phase and the thiophene phase, and at least a portion of the catalyst phase is continuously recycled to the reaction zone and the thiophene phase is processed for recovery of the desired products. If the catalyst is a solid, it may be disposed as a fixed bed within a reactor and the reactants continuously passed through the bed at condensation conditions. The condensation product in the effluent is recovered and the unreacted materials may be recycled to the reaction zone.

The solid catalysts mentioned herein may be used in the finely divided state in a "fluidized" type of operation. In this method of operation the charge is passed upwardly through a bed of finely divided catalyst causing the catalyst particles to become motionalized and forming a fluid-like mass. The catalyst is intermittently or continuously withdrawn from the reaction zone, regenerated, and returned thereto. Another type of operation employing solid catalyst is the "moving bed" operation wherein a compact bed of catalyst is continuously passed through the reaction zone concurrently or countercurrently to the incoming reactants and passed therefrom into a regeneration zone from which it is returned to the reaction zone after having been regenerated. Another alternative mode of operation comprises suspending finely divided solid catalyst in the stream of charge stock and treating said suspension under suitable conditions of temperature and pressure to produce the desired reaction.

The process of this invention may be conducted at temperatures within the range of from about −20° C. to about 175° C. The preferred temperature will depend upon the particular thiophene and bicycloalkene being charged to the process and upon the activity of the particular condensation catalyst being employed. With very active catalysts such as unmodified aluminum chloride, lower temperatures must be employed in order to avoid decomposition and other undesirable side reactions. When less active catalysts such as those of the metal oxide type are employed, higher temperatures must be used in order to have a reasonable rate of reaction. If the temperature exceeds about 175° C., decomposition of the thiophene becomes excessive with nearly all catalysts.

The pressure preferably is such that substantially all of the reactants are in the liquid phase. In general, these pressures will lie within the range of from about 1 to about 100 atmospheres.

When a liquid catalyst is used, the contact time may be in the range of from about three minutes to about three hours. If solid catalyst is used in a fixed bed, the liquid hourly space velocity defined as the volume of total feed to the reaction zone divided by the superficial volume of the catalyst in said zone should be in the range of from about 0.1 to about 10.

A molecular excess of the thiophene over the bicycloalkene in the reaction zone promotes reaction between the thiophene and the condensable compound and suppresses undesirable side reactions.

The following example is given to illustrate our invention but it is not introduced with the intention of unduly limiting the generally broad scope of said invention.

*Example*

34 g. of thiophene were reacted with 18.8 g. of bicyclo-(2,2,1)-2-heptene in the presence of 10 ml. of boron fluoride-ethyl ether complex at 27–40° C. in a three-neck alkylating flask. There was recovered from the products 11 g. of 2-monobicycloheptylthiophene, boiling point 89° C. at 2 mm. of mercury pressure, refractive index $n_D^{20}$ of 1.5564, and 8 g. of 2,5-dibicycloheptylthiophene, boiling point 181° C. at 2 mm. of mercury pressure, and refractive index $n_D^{20}$ of 1.5670. In addition there were 8 g. of higher boiling material recovered.

We claim as our invention:
1. Monobicycloalkylthiophene.
2. Dibicycloalkylthiophene.
3. 2-(2-bicycloheptyl)thiophene.
4. 2,5-di(2-bicycloheptyl)thiophene.
5. A process which comprises reacting a thiophene containing a substitutable nuclear hydrogen atom with a bicycloalkene at a temperature of from about −20° C. to about 175° C. and in the presence of an acid-acting condensation catalyst.
6. The process of claim 5 further characterized in that said catalyst is a metal halide-containing condensation catalyst.
7. The process of claim 5 further characterized in that said catalyst is a mineral acid-containing condensation catalyst.
8. The process of claim 5 further characterized in that said catalyst is an organic acid-containing condensation catalyst.
9. The process of claim 5 further characterized in that said catalyst is a metal oxide-containing condensation catalyst.
10. The process of claim 5 further characterized in that the condensation catalyst comprises boron fluoride.
11. A process which comprises reacting a thiophene containing a substitutable nuclear hydrogen atom with a bicycloalkene that contains two 5-carbon atom rings at a temperature of from about −20° C. to about 175° C. and in the presence of an acid-acting condensation catalyst.

12. The process of claim 11 further characterized in that said catalyst is a metal halide-containing condensation catalyst.

13. The process of claim 11 further characterized in that said catalyst is a mineral acid-containing condensation catalyst.

14. The process of claim 11 further characterized in that said catalyst is an organic acid-containing condensation catalyst.

15. The process of claim 11 further characterized in that said catalyst is a metal oxide-containing condensation catalyst.

16. The process of claim 11 further characterized in that the condensation catalyst comprises boron fluoride.

17. A process for producing 2-monobicycloheptylthiophene and 2,5 - dibicycloheptylthiophene which comprises reacting thiophene with bicyclo-(2,2,1)-2-heptene in the presence of a catalyst comprising boron fluoride.

18. A compound selected from the group consisting of monobicycloalkylthiophene and dibicycloalkylthiophene.

HERMAN PINES.
BRUNO KVETINSKAS.

REFERENCES CITED

The following references are of record in the file of this patent:

UNITED STATES PATENTS

| Number | Name | Date |
| --- | --- | --- |
| 1,939,932 | Thomas | Dec. 19, 1933 |
| 2,396,144 | Anderson | Mar. 5, 1946 |
| 2,469,823 | Hansford | May 10, 1949 |
| 2,480,267 | Schmerling | Aug. 30, 1949 |
| 2,480,268 | Ipatieff | Aug. 30, 1949 |